United States Patent [19]
Krapp

[11] 3,787,726
[45] Jan. 22, 1974

[54] CONDUCTIVE LINE FOLLOWING DEVICE FOR STEERING A VEHICLE

[76] Inventor: Wolfgang Krapp, Im Eicken, Marienheide-Kalsbach, Germany

[22] Filed: Oct. 22, 1971

[21] Appl. No.: 191,650

[30] Foreign Application Priority Data
Oct. 23, 1970  Germany............... P 20 52 102.2

[52] U.S. Cl................ 318/587, 318/576, 318/653, 180/6.5
[51] Int. Cl......................... G05d 1/00, B64c 13/18
[58] Field of Search........... 318/576, 587, 653, 662; 180/6.5; 336/30, 130

[56] References Cited
UNITED STATES PATENTS

| | | | |
|---|---|---|---|
| 3,231,839 | 1/1966 | Konig | 336/30 |
| 3,217,308 | 11/1965 | Maxwell, Jr. | 336/130 X |
| 3,156,989 | 11/1964 | Atkinson | 318/587 X |
| 3,250,983 | 5/1966 | Atkinson | 318/587 X |
| 3,008,532 | 11/1961 | Reed | 318/587 X |
| 3,431,996 | 3/1969 | Giles et al. | 318/587 X |
| 3,614,990 | 10/1971 | Schnitzler | 318/587 X |
| 3,482,644 | 12/1969 | Krieger | 318/576 X |
| 3,021,463 | 2/1962 | Haldemann | 318/576 |
| 2,946,939 | 6/1960 | Lind | 318/576 X |
| 3,612,206 | 10/1971 | Ohntrup | 318/587 X |
| 3,556,244 | 1/1971 | Gray | 318/587 X |
| 3,037,575 | 6/1962 | Quinn | 318/587 X |
| 3,033,305 | 5/1962 | Harned et al. | 318/587 X |

Primary Examiner—T. E. Lynch
Attorney, Agent, or Firm—Michael S. Striker

[57] ABSTRACT

An electronic regulating arrangement in which an analog signal generator is either inductively or capacitively coupled with an electrically conductive element having an edge displaceable with respect to a centerline of the active operating zone of the signal generator. When the edge is displaced with respect to the centerline of the active zone, when the edge is projected in the plane of the active zone, the generator emits a voltage proportional to the projected displacement of the edge relative to the centerline. The voltage increases positively or negatively in proportion to the displacement of the edge from the centerline, and dependent upon the direction of the displacement. A zero output voltage is obtained when the edge coincides, when projected, onto the centerline of the generator's active zone.

12 Claims, 4 Drawing Figures

CONDUCTIVE LINE FOLLOWING DEVICE FOR STEERING A VEHICLE

BACKGROUND OF THE INVENTION

The present invention relates to electronic regulating arrangements with components that radiate a high-frequency magnetic or electric field, and which involve electrically conductive materials. The arrangement pertains to inductive or capacitive circuits requiring no physical contacting, and which produce threshold signals when a predetermined threshold is exceeded. Such characteristics of a regulating circuit have many applications for industrial uses. In particular cases, the output signal voltage of a proximity component is related in an analog manner to the spacing of the materials which are in proximity. With such an arrangement of components, distances or spaces can, for example, be electronically measured.

It is the object of the present invention to provide an electronic regulating arrangement which is applicable to all industrial uses as, for example, motor vehicle steering or follow-up control, threshold control, position control, and the like, through providing a circuit which has high reliability in operation, is sensitive, and is simple in design and construction.

Arrangements are known in the art which use a transmitter and receiver of construction involving electromagnetic waves or optoelectronic media. Arrangements are also known which use magnetically conductive materials that are sensed through inductive sensors. Such arrangements known in the art are used for automatic steering of motor vehicles.

The objects of the present invention are achieved by providing an analog signal generator or transducer at a fixed position or spacing with respect to an electrically conductive edge. The analog signal generator has an active operating zone with a central line from which the projection of the edge can be displaced. The signal generator provides an output voltage which is substantially proportional to the displacement of the edge projection relative to this central line. The output voltage of the signal generator is either positive or negative depending upon the direction of the displacement of the edge. The analog signal generator does not contact the conductive material or edge. When the conductive edge is located at the central line of the active zone of the signal generator, so that the edge coincides with that central line, then the output voltage from the generator is zero. The output voltage increases in the negative direction, in a proportional manner, with the sidewise displacement of the edge, while the spacing of the signal generator from the conductive material remains constant. Such negative increasing voltage occurs when the conductive element is displaced so that more electrically conductive material is brought into proximity of the active zone of the signal generator, since this results in a damping effect of the high-frequency magnetic field of the signal generator. The output voltage increases in a positive direction in a similar manner, after passage through zero, when the displacement of the edge is such that the electrically conductive material is moved away from proximity of the signal generator so as to decrease the damping effects. The voltage function obtained as a result from such an arrangement is in particular adapted for carrying out a regulating process.

If a motor vehicle is equipped with an analog signal generator as described above, for aiding in steering of the vehicle, then the electrically conductive material may be in the form of a track element mounted on a base. Depending upon the position of the edge of the electrically conductive material, the circuit may then be designed to cause amplification of the torque, in a corresponding manner, for the steering position motors. Thus, the circuit provided in conjunction with the signal generator serves to furnish an output signal which upon amplification produces the appropriate torque of the steering motors. The electrically conductive material can also be in the form of foil-type constructions.

One conventional arrangement for steering of motor vehicles uses a stationary high-frequency transmitter in conjunction with receiving coils and guidance wires embedded in the floor of the vehicle. In constrast with this conventional arrangement, the present invention provides the advantage of a simple electronic circuit with a low-cost track system which has inherently the capacity for simple variations and modifications in the construction and for extension of the system.

The present invention relates to a regulating arrangement for controlling of unmanned vehicles, particularly to vehicles which are guided along a predetermined path.

For unmanned vehicles of this type, it is known in the art to provide for their control, a sheet-metal strip along the driving path. At least two magnetic sensors are located along the vehicle, and are spaced from each other so that the spacing is equal to the width of the sheet metal strip. Each of the sensors forms a magnetic circuit in which the magnetic flux is dependent upon the prevailing air gap. The sensors provide control signals as a function of the magnetic characteristics associated with the circuit. When the control signals exceed a predetermined threshold level or value, a corresponding steering signal is transmitted through a steering programmer.

In the preceding arrangement, it is necessary to provide magnetically conductive materials in the form of conductive strips. For this purpose, only sheet metal is practical. The use of such sheet metal, however, has disadvantages as, for example, difficulties encountered in installing the sheet metal strips. Thus, curvatures of the strips are difficult to produce. Rusting or corrosion of the metal strip is also a problem. For a smooth driving arrangement, considerable complexity in the controlling circuitry is required.

SUMMARY OF THE INVENTION

It is an object of the present invention to improve the conventional servo steering arrangements for motor vehicles.

It is also an object of the present invention to provide a steering arrangement for motor vehicles which does not require any difficult contacting between the sensing and controlling elements.

Another object of the present invention is to provide an arrangement in which a motor vehicle is steered in an analog manner, in accordance with the displacement of a predetermined edge of an electrically conductive material.

It is a further object of the present invention to provide the steering arrangement for motor vehicles, as set forth, which may be readily fabricated through its inherently simple design and construction.

A still further object of the present invention is to provide an arrangement of the foregoing character, which has high operating reliability and may be economically maintained.

The objects of the present invention are achieved by providing a borderline or edge between electrically conductive and non-conductive material. The motor vehicle is equipped with an analog signal generator which radiates a high-frequency magnetic field. This magnetic field is damped through the electrically conductive material. When the projection of the borderline or edge coincides with a central line of the active zone of the signal generator, the latter provides zero output voltage. When, on the other hand, the predetermined edge of the electrically conductive material experiences a displacement, then the output voltage increases in a positive or negative manner, depending upon the direction of displacement. The output voltage is made proportional to the displacement.

In accordance with the present invention it is only necessary to arrange the analog signal generator at a fixed distance from the electrically conductive edge or line, and to provide circuitry for amplifying the signal from the generator, and to apply the amplified signal to a positioning member. In the present case, the positioning member is a steering motor, for example, which provides output torque in accordance with the output signal derived from the signal generator. A motor vehicle equipped in this manner will drive along the conductive line and thereby experience smooth steering even when driving around curves.

In order to extend the distance network in any desired manner, branches or switching tracks are required. This may be fulfilled in accordance with the present invention in a simple manner, by providing a strip of electrically conductive material along the driving path. Such electrically conductive material may, for example, be in the form of aluminum foil provided with a self-adhesive surface. With this arrangement, a low-cost track system which can be modified or changed in a simple manner, is realized.

The novel features which are considered as characteristic for the invention are set forth in particular in the appended claims. The invention itself, however, both as to its construction and method of operation, together with additional objects and advantages thereof, will be best understood from the following description of specific embodiments when read in connection with the accompanying drawing.

DESCRIPTION OF THE PREFERRED EMBODIMENTS

Figure 1:
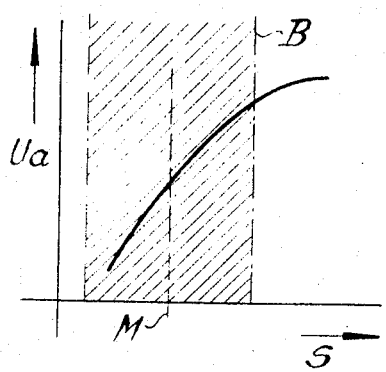
FIG. 1 is a graphical representation of the output voltage of a signal generator, as a function of relative displacement, in accordance with the present invention.
Figure 2:
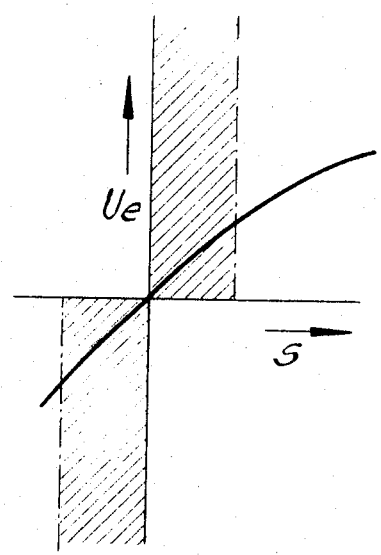
FIG. 2 is a graphical representation of the output voltage of the signal generator when modified through circuitry in accordance with the present invention.

Referring to the drawing, and in particular to FIGS. 1 and 2, the voltages Ua and Ue are plotted there as a function of displacement $s$ of the relative surfaces of two bodies. The utilized region of displacement is denoted by B, and runs between the dash-dot borderlines. The displacement is zero for its center line M.

Figure 4:
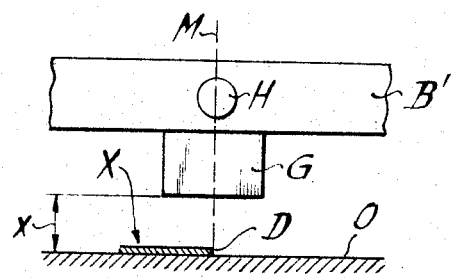
FIG. 4 is a schematic diagram illustrating the use of the present invention in conjunction with guided vehicles.

In FIG. 4, there is shown the projection of an edge D of a conductive foil or element X constituting a passive component capable of conducting electric current but physically unconnected to a source of current and having an edge D defining a fixed reference relative to which a vehicle B' can move laterally. The position of this element is shown in FIG. 4 in relation to a driving vehicle B', an analog signal generator G and the central line M of the active zone. The foil or element X is made of electrically conductive material, and is situated upon the base O.

The sensing of the edge D of the electrically conductive element by the analog generator G which in this embodiment is a magnetic field generating means, takes into account a fixed spacing x between the latter and the turbulent medium prevailing during the sensing operation. Variations in the spacing have the same effect upon the analog signal generator as a displacement of the edge D. This edge D terminates, as shown in the drawing, in the position of the vehicle B' shown therein, and the analog signal generator G at the central line M.

At the position of the edge at the central line, an output voltage Ue = 0 is obtained from the analog signal generator, as shown in FIG. 2. If, now, a sidewise displacement of the edge causes more conductive material to be brought into proximity of the active zone of the analog signal generator G, then the output voltage Ue increases negatively, for example, and proportional to the magnitude of the displacement of the edge. When the displacement of the edge is in the opposite direction, the output voltage Ue increases in the positive direction with increase in the displacement. The output voltage has, thereby, varying slopes dependent upon the applied amplification.

Figure 3:
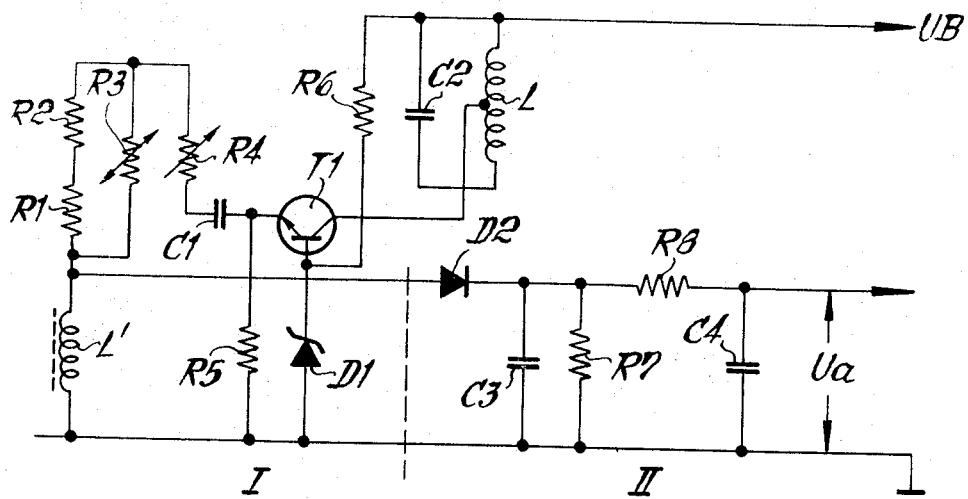
FIG. 3 is an electrical circuit diagram of an inductive arrangement for a proximity sensor.

The inductive analog signal generator, shown in FIG. 3, has an oscilator with temperature compensation I, and a rectifier with filter II. In the collector circuit of the oscillator transmitter T1, in the oscillating circuit having a capacitor C2 and inductance L. The feedback coupling winding L' is connected in the emitter circuit of the transistor T1, which also contains a coupling capacitor C1. This coupling capacitor C1 serves to remove the D.C. component from the emitter of the transistor. A resistor R4 connected in series with the capacitor C1 determines the amplitude of the signal applied to the transistor, and resistors R1, R2, and R3 serve as temperature compensation resistors, with negative temperature coefficients of resistance. The operating point of the transistor T1 in the oscillating circuit is determined by the Zener diode D1, resistances R6 and R5. The resistor R5 is connected between the emitter of transistor T1 and the ground potential or common return potential for the circuit. Resistor R6, on the other hand, is connected between the base of the transistor T1 and the supply voltage UB. Resistors R1 and R2 are connected in series, and this series circuit is in turn bridged by the resistor R3 in variable form. Thus, the resistors R1 and R2 are both fixed resistors, whereas the resistor R3 is constructed of the variable resistor type. The resistor R4 in series with the capacitor C1 is also of the variable type and thereby permits adjusting of the amplitude of the signal applied through the emitter of the transistor T1. The inductance L' is connected in series with the temperature compensation resistors R1, R2 and R3. The Zener diode D1 is connected between the base of the transistor T1 and the common return or ground potential. In the appended claims components L', D1, D2, C3, C4, R7 and R8 are referred to as signal generating means responsive to field strength variations and operative for generating a signal which varies in dependence upon the lateral deviation of the vehicle.

Signal rectification and filtering is accomplished through the feedback coupling winding L', the diode D2 connected to one terminal of the winding L', and the capacitors C3, C4, as well as the resistors R7 and R8. The capacitor C3 is connected to the cathode of the diode D2, with one of its terminals, and the other terminal of this capacitor is connected to ground potential. This capacitor C3 is, in turn, bridged by the resistor R7. One terminal of the resistor R8 is connected to the junction of the resistor R7 and capacitor C3. The other terminal of resistor R8 is connected to one terminal of the capacitor C4, which has its other terminal or electrode connected to ground potential. The output voltage Ua appears across the capacitor C4.

The magnetic field of the inductance L of the high-frequency oscillating circuit containing capacitor C2, can reach freely outward and will create eddy currents in the electrically conductive material to damp the voltage amplitude of the oscillator. The modification of the amplitude function by the filtering circuit II is made dependent upon the output voltage Ua in relation to the displacement of the relative edges or surface, in accordance with FIG. 1. Through the application of predetermined circuitry, it is possible to obtain a proportional relationship within a predetermined region, in accordance with FIG. 2. With this arrangement, the displacement of an element H (FIG. 4) can be determined through amplification, for example, of the input voltage.

The application of the electronic regulating arrangement, in accordance with the present invention, extends beyond metallic foil in the form of track. In fact, the present electronic regulating arrangement is applicable to all bordering lines or surfaces between electrically conductive and non-conductive media. The present invention provides for exceptionally low failure rate, high sensitivity, and simplicity of construction. In accordance with the operating region shown by the curve of FIG. 2, the output voltage can assume increasing or decreasing positive values, as well as increasing or decreasing negative values depending upon the direction of displacement.

The preceding arrangement is particularly applicable for steering of motor vehicles. Thus, a positive voltage can be used, for example, in a simple manner for turning right, whereas the negative output voltage is used for turning left. A zero output voltage would then correspond to driving straight ahead.

With threshold regulation, right and left operation of the supply pump is not desirable under particular circumstances. Instead, the stationary condition is to be noted by an output voltage of zero when the threshold level is balanced. Pumping operation is to be described by a positive voltage while the level is dropping.

It will be understood that each of the elements described above, or two or more together, may also find a useful application in other types of electronic regulating arrangements differing from the types described above.

While the invention has been illustrated and described as embodied in an electronic regulating arrangement, it is not intended to be limited to the details shown, since various modifications and structural changes may be made without departing in any way from the spirit of the present invention.

Without further analysis, the foregoing will so fully describe the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. An arrangement for detecting the position of a laterally movable body, comprising in combination a passive component capable of conducting electric current but physically unconnected to a source of current and defining a fixed reference relative to which said body can move laterally; field-generating means mounted on said body for lateral movement therewith spaced from said passive component and operative for establishing a field oriented to intersect said component to an extent dependent upon the lateral deviation of said body from said reference, so that the strength of the field established by said field-generating means will vary in dependence upon the extent to which said passive component is intersected by said field and thereby in dependence upon said lateral deviation; and signal-generating means electrically connected to said gield-generating means and operative for monitoring said lateral deviation by monitoring the changes in the strength of the field established by said field-generating means such as are due to changes in the extent to which said passive component is intersected by said field and thereby such as are due to changes in said lateral deviation, said field-generating means comprising field-generating inductor means mounted on said body for lateral movement therewith spaced from said passive component, energizing means connected to said inductor means for establishing a flow of periodic magnetizing current through said inductor means, said inductor means being so positioned and oriented that the magnetic field established by said inductor means is oriented to intersect said component to an extent dependent upon the lateral deviation of said body from said reference, so that the strength of said magnetic field will vary in dependence upon said lateral deviation and react back upon said inductor means to affect the latter, and said signal-generating means comprising means electrically connected to said inductor means and operative for monitoring said lateral deviation by monitoring the effect upon said inductor means of changes in the strength of the magnetic field established by said inductor means due to changes in said lateral deviation.

2. An arrangement as defined in claim 1, wherein said field-generating means comprises field-generating inductor means mounted on said body spaced from said passive component, energizing means connected to said inductor means for establishing a flow of periodic magnetizing current through said inductor means, said inductor means being so positioned and oriented that the magnetic field established by said inductor means is oriented to intersect said component to an extent dependent upon the lateral deviation of said body from said reference, so that the strength of said magnetic field will vary in dependence upon said lateral deviation and react back upon said inductor means to vary the voltage across said inductor means in dependence upon said lateral deviation, and wherein said signal-generating means comprises means electrically connected to said inductor means and operative for monitoring said lateral deviation by monitoring the voltage across said inductor means.

3. An arrangement as defined in claim 1, wherein said signal-generating means comprises means operative for generating a signal whose magnitude varies in dependence upon said lateral deviation and whose sign is indicative of the direction of such deviation.

4. An arrangement as defined in claim 1, wherein said signal-generating means comprises means operative for generating a signal whose magnitude varies proportionally to said lateral deviation.

5. An arrangement as defined in claim 1, further including a vehicle, said field-generating means and said signal-generating means being mounted on said vehicle, and said passive component being an elongated path-defining strip of electrically conductive material.

6. An arrangement as defined in claim 1, and further including a servo positioning system having an input connected to said signal-generating means for moving said body to reduce said deviation to zero.

7. An arrangement as defined in claim 1, wherein said field is an A.C. field and wherein the amplitude of said field varies in dependence upon the lateral deviation of said body from said reference.

8. An arrangement as defined in claim 5, wherein said path-defining strip has an adhesive face to facilitate laying.

9. An arrangement as defined in claim 8, wherein said strip comprises aluminum foil.

10. An arrangement as defined in claim 7, wherein said field-generating means includes a field-generating component and a transistor oscillator connected to said field-generating component, and wherein said signal-generating means includes rectifying means connected to said field-generating component for furnishing a rectified signal whose amplitude varies in dependence upon said lateral deviation and also includes filter means for filtering said rectified signal to produce a steady-value D.C. signal varying in dependence upon said lateral deviation.

11. An arrangement as defined in claim 1, wherein said field is a magnetic field and wherein said field-generating means is inductively coupled with said passive component.

12. An arrangement as defined in claim 1, wherein said field-generating means is capacitatively coupled with said passive component.

* * * * *